(12) United States Patent
Singh et al.

(10) Patent No.: US 7,823,778 B1
(45) Date of Patent: Nov. 2, 2010

(54) WIRELESS INVENTORY SCANNER SYSTEM AND METHOD

(75) Inventors: Siddhartha Singh, Monmouth Junction, NJ (US); Patrick Vito Bellone, Fanwood, NJ (US)

(73) Assignee: CellCo Partnership, Basking Ridge, NJ (US)

( * ) Notice: Subject to any disclaimer, the term of this patent is extended or adjusted under 35 U.S.C. 154(b) by 245 days.

(21) Appl. No.: 11/882,971

(22) Filed: Aug. 8, 2007

(51) Int. Cl.
*G06F 19/00* (2006.01)

(52) U.S. Cl. ................ 235/385; 235/375; 235/383; 340/572.1

(58) Field of Classification Search ............ 235/383, 235/385, 375; 340/572.1
See application file for complete search history.

(56) References Cited

U.S. PATENT DOCUMENTS

| 6,714,969 | B1 | 3/2004 | Klein et al. | |
|---|---|---|---|---|
| 7,065,344 | B2 | 6/2006 | O'Hagan et al. | |
| 2006/0071072 | A1* | 4/2006 | McDonald | 235/385 |
| 2006/0076401 | A1* | 4/2006 | Frerking | 235/380 |
| 2006/0280181 | A1* | 12/2006 | Brailas et al. | 370/392 |
| 2007/0103303 | A1* | 5/2007 | Shoarinejad | 340/572.1 |
| 2007/0250358 | A1* | 10/2007 | Le | 705/7 |
| 2007/0288515 | A1* | 12/2007 | Sarma et al. | 707/104.1 |
| 2008/0120200 | A1* | 5/2008 | Hurtis et al. | 705/28 |
| 2008/0143485 | A1* | 6/2008 | Frerking | 340/10.1 |
| 2010/0174386 | A1* | 7/2010 | Sarma et al. | 700/7 |

* cited by examiner

*Primary Examiner*—Thien M. Le
*Assistant Examiner*—Tuyen K Vo
(74) *Attorney, Agent, or Firm*—McDermott Will & Emery LLP

(57) ABSTRACT

A system for inventory scanning includes scanning devices for scanning information representing inventory items to produce input data for uploading to an inventory management system over a radio-access network, such as a Code Division Multiple Access (CDMA) wireless network. A scanner adapter, such as a web service adapter, is coupled to the inventory management system for transferring the input data from the scanning devices to the inventory management system. The adapter also receives control information from the inventory management system for delivery to the scanning devices. The control information is transferred to the scanning devices to manage inventory operations performed by the scanning devices, for example, operations that may be performed by and/or data that may be accessed by an identified individual user.

13 Claims, 4 Drawing Sheets

WIRELESS INVENTORY SCANNER SYSTEM AND METHOD

TECHNICAL FIELD

This disclosure relates to wireless scanners, and more particularly, to systems and methods for supporting operations of wireless scanning devices that perform inventory management functions.

BACKGROUND

Inventory management involves portable scanners for reading barcodes carried by inventory items. A conventional inventory scanning method includes scanning goods available in stocks, and storing scanning results in scanners. After the scanning is completed, the scanner is connected to a terminal, such as a personal computer (PC), to transmit accumulated data in batch to an inventory management system.

However, there is a need for an enhanced inventory scanning mechanism that would enable operators to transfer scanned inventory data from scanners to the inventory management system in real time while inventory items are being scanned.

Also, to increase efficiency of the inventory scanning process, it would be desirable to provide management of scanners so as to enable operators to use them not simply for scanning but for performing more complex inventory operations.

SUMMARY OF THE DISCLOSURE

Wireless inventory scanner systems and methods are disclosed herein, which incorporate concepts to address above noted problems with inventory scanning and result in an enhanced inventory scanner mechanism.

In accordance with one aspect of the disclosure, a system for inventory scanning includes a plurality of scanning devices for scanning information representing inventory items to produce input data. The scanning devices are configured to communicate with a scanner adapter over a radio-access network, such as a Code Division Multiple Access (CDMA) wireless network. The scanner adapter is coupled to an inventory management system for transferring the input data from the scanning devices to the inventory management system, and for receiving control information from the inventory management system for delivery to the scanning devices. The control information is transferred to the scanning devices to manage inventory operations performed by the scanning devices.

In particular, the scanner adapter may provide a scanning device with validation data that defines information allowed to be read by the scanning device. The validation data may be supplied to the scanner adapter from the inventory management system.

Also, the scanner adapter may provide a scanning device with user identification data to define information presented by the scanning device to a particular user identified by the user identification data. The scanner adapter may produce the user identification data in response to user identification information supplied from the inventory management system.

The scanning devices may be configured for selecting between communicating with the scanner adapter over a radio-access network or over a local area network. The scanner adapter may be coupled to the inventory management system over an Internet Protocol (IP) network.

A data synchronization system may be connected to the scanner adapter for synchronizing data in the scanning devices with the control information supplied from the inventory management system.

A scanner manager may be coupled to the scanner adapter for controlling user access to the scanning devices. For example, the scanner manager may be used to prevent unauthorized access to the scanning devices.

Also, the scanner manager may be used to set a scanning device into a predetermined mode of operation. The scanner manager may enable the scanning device to scan predetermined information, e.g. a predetermined type of barcode.

Moreover, the scanner manager may enable a user of a scanning device or a system administrator to monitor data transferred from the scanning device to the inventory management system before the transferred data are loaded into the inventory management system.

In accordance with a method of the present disclosure, information representing an inventory item is scanned using a scanning device. The scanned information is transferred over a radio-access network from the scanning device to a scanner adapter for loading into an inventory management system. Control information from the inventory management system is downloaded to the scanning device over the radio-access network to manage operation of the scanning device.

The scanning device may be provided with user identification data for defining which information is allowed to be presented by the scanning device to a particular user identified by the user identification data.

Also, the control information may include validation data for defining which data are allowed to be transferred from the scanning device, and update data for updating control data stored in the scanning device.

The scanner management may be carried out for enabling a user to monitor the scanned information transferred to the inventory management system before the transferred information is loaded into the inventory management system.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DISCLOSURE OF THE EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The present disclosure will be made using the example of inventory scanning devices configured to scan a barcode and communicate with an inventory management system over a radio-access network. It will become apparent, however, that the concept of the disclosure is applicable to any portable devices capable of entering information into a management system.

Figure 1:
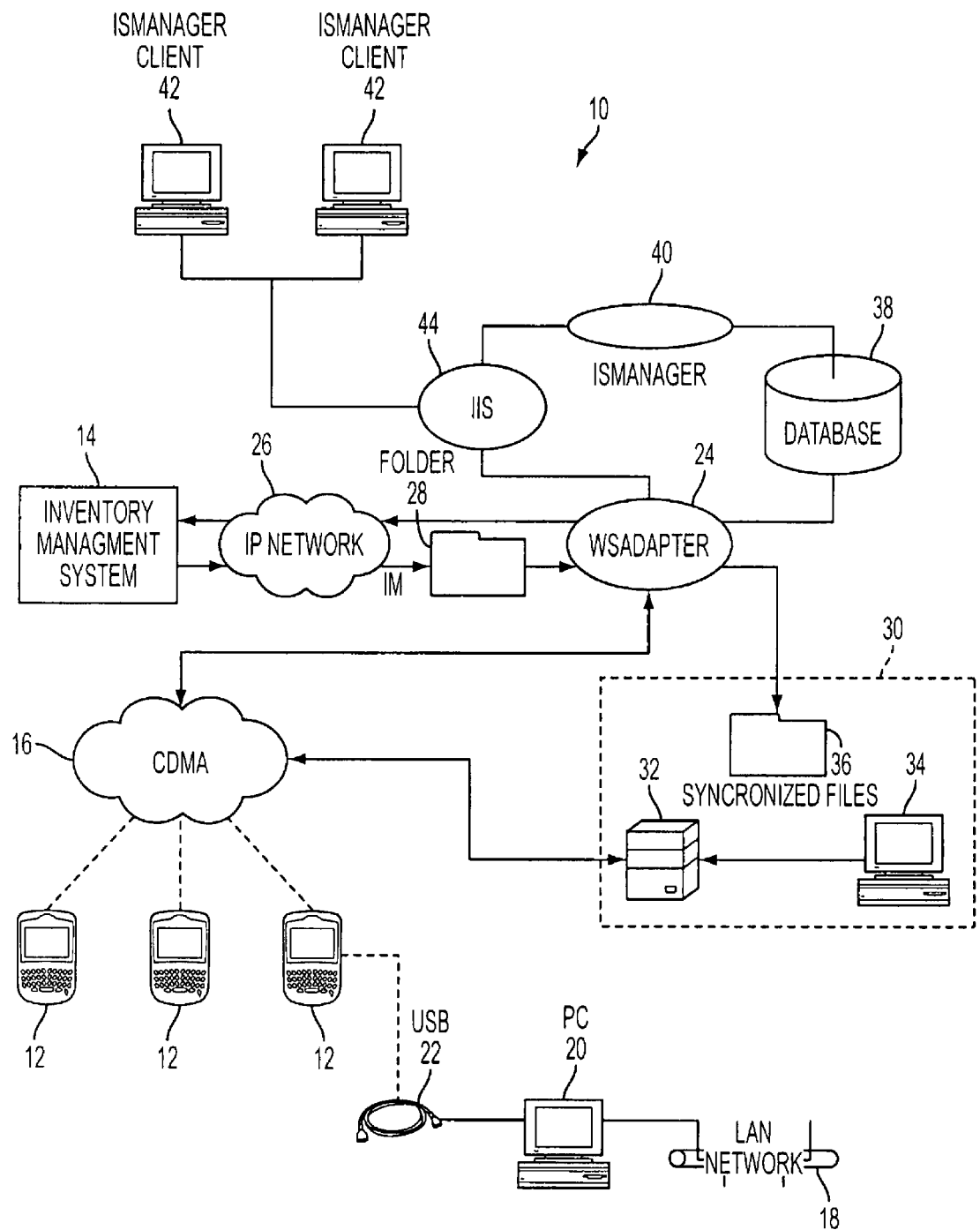
FIG. 1 depicts an exemplary inventory scanning system of the present disclosure.

FIG. 1 schematically illustrates an exemplary inventory scanning system 10 of the present disclosure that supports interactions between multiple wireless scanning devices 12 and an inventory management system 14. Each scanning device 12 may be any portable electronic device configured to collect data relating to inventory items, such as goods or materials, and capable of providing wireless communications.

For example, the scanning device 12 may be configured to scan one-dimensional (1D) and two-dimensional (2D) barcodes identifying inventory items. A barcode may be a machine-readable representation of information that uses dark indicia on a light substrate to create high and low reflectance which is converted by a scanner to 1 s and 0 s of data. Barcodes may include patterns of printed parallel lines having widths and spacings representing data. Also, barcodes may be patterns of dots or concentric circles. 1D barcodes may be represented by linear patterns. 2D barcodes or matrix barcodes encode data in a two-dimensional manner and have higher data representation capability than 1D barcodes.

The scanning device 12 may include a barcode reader or scanner containing a light source to illuminate the barcode and a photo-electrical converter for producing electrical pulses or other electrical signals based on reflected light signals. For example, the barcode reader may be based on a laser or light-emitting device (LED) light source and an appropriate sensor of reflected light. To provide reading 2D barcodes, in addition to 1D barcodes, the scanning device 12 may include a 2D imaging scanner that uses a small video camera to capture an image of a barcode. A digital image processing technique then may be used to decode the bar code from the captured image.

In addition to barcode reading functions, the scanning device 12 may be enabled for performing additional inventory-related functions described in more detail below. The scanning device 12 may be equipped with a memory device to store collected data and control information, such as inventory scanner application software, provided to support the inventory-related functions. The scanning device 12 may include a data processing unit for running the inventory scanner application software. As discussed in more detail later, the scanner application software in the scanning device 12 may be managed by the inventory management system 14.

Each scanning device 12 may be configured to support wireless communications over a radio-access network 16, such as a Code Division Multiple Access (CDMA) wireless network. Also, the scanning device 12 may be configured for connection to a local area network (LAN) 18, for example, via a personal computer (PC) 20. The connection to the PC 20 may be provided using a Universal Serial Bus (USB) interface 22.

The system 10 also includes a Web Services (WS) adapter 24 coupled for communication via the radio-access network 16, and possibly through other data networks such as the LAN 18 and/or the public Internet (not shown). Web Services, such as implemented by the adapter 24, consist of a software system on a server platform or host computer to provide machine to machine interaction over a network, in this case between the scanning devices 12 and various other systems such as the inventory management system 14. Although a variety of implementations are available, a typical implementation may use XML communications between client software on the scanners server software of the WS adapter 24 in accord with the SOAP or other applicable standard. For example, the WS adapter 24 may be a processing engine provided on a communication server connectable to the inventory management system 14 over an Internet Protocol (IP) network 26 and for communication with the scanning devices 12 via the radio-access network 16 and/or the LAN 18. Over the radio-access network 16, each scanning device 12 may upload collected data to the Web Service (WS) adapter 24 that transfers data files from the scanning device 12 to the inventory management system 14. The scanning device 12 may have a selector for selecting between uploading data over the radio-access network 16 and uploading data over the LAN 18. The WS adapter 24 also supports communications downstream to the scanning devices 12 over the selected network 16 or 18.

Via an inventory management (IM) folder 26, the WS adapter 24 receives control files from the inventory management system 14 in order to download control information to a selected scanning device 12. In particular, the WS adapter 24 transfers the control information to a data synchronization system 30 that communicates with the scanning devices 12 over the radio-access network 16 to download the control information. Uploading data files from the scanning devices 12 to the inventory management system 14 and downloading control information from the inventory management system 14 to the scanning devices 12 are discussed in more detail below.

The data synchronization system 30 may include a data synchronization server 32 controlled by a data synchronization manager 34. The control information from the WS adapter 24 may be transferred to an outbound directory 36 of the data synchronization system 30. Via the radio-access network 16, the data synchronization server 32 may deliver the control information from the outbound directory 36 to the scanning devices 12. For example, the Intellisync Mobile Suite developed by the Intellisync Corporation may be used to run the data synchronization server 32. In general, when a synch server detects an event requiring synchronization of client data, e.g. an update of data for a scanning device 12 in the outbound directory, the server will initiate its synchronization process. In a pull model the server would wait for an in-bound communication from the client device. Most wireless networks today, however, offer one or more mechanisms by which the server can send a notification to the relevant client device, in response to which, the client device initiates a session to the server to synchronize the client data with that available through the server. Hence, in our example, when there is updated data in the outbound directory 36 for a particular one of the scanning devices 12, the server 32 sends a synch notification, for example, as an SMS message through the CDMA type radio-access network 16. In response, the notified scanning device 12 contacts the server 32 through the network 16, and the server sends the updated data to the particular scanning device 12 through the network 16.

Data uploaded from the scanning devices 12 using the WS adapter 24 may be stored in a database 38, which also may be used for storing user access information indicating which data in the inventory system are allowed to be accessed by a particular user. The user access information may be stored in a user access information table in association with user identification information. Further, the database 38 may store historical information about transactions performed via the WS adapter 24. For example, the database 38 may be a Structured Query Language (SQL) Server database.

An Inventory Scanner (IS) manager 40 may access the database 38 to manage data transfer when the collected data are being uploaded from the scanning device 12 to the inventory management system 14. The IS manager 40 may be a web application provided at the communication server, together with the WS adapter 24. The IS manager 40 enables a system administrator or a user of the scanning device 12 to monitor transfer of the collected data to the inventory management system 14 using IS manager clients 42, such as computer devices or personal digital assistant (PDAs). An Internet Information Server (IIS) 44 may be used to enable IS manager clients 42 to interact with the IS manager 40 and WS adapter 24. The IIS was developed by the Microsoft Corporation to run Internet-based services for servers.

For example, a user of the scanning device 12 may access the IS manager client 42 using a computer device with web access to check details and status of data files being uploaded from the scanning device 12 or check the history of transactions performed by the scanning device 12. The user of each scanning device 12 may be restricted to accessing information relating only to a particular scanning device 12. The system administrator may be enabled to use the IS manager client 42 to check information relating to all transactions performed by all scanning devices 12 in the system.

Also, the IS manager 40 may manage user access to the scanning devices 14. In particular, the IS manager 40 may enable the system administrator to set user profiles and establish user security limitations to prevent unauthorized access to the inventory scanning system 10. The user access management may be performed based on the user access information stored in the database 38.

Further, the IS manager 40 may provide system settings, including setting a mode of operation for a particular scanning device 12. For example, the system administrator may use the IS manager client 42 to set particular types of barcodes that can be read by the scanning device 12. Also, the IS manager client 42 may enable the system administrator to set various functions that can be performed by a particular scanning device 12 or by a group of the scanning devices 12, and to set transaction codes defining transactions preformed by the scanning devices 12.

Figure 2:
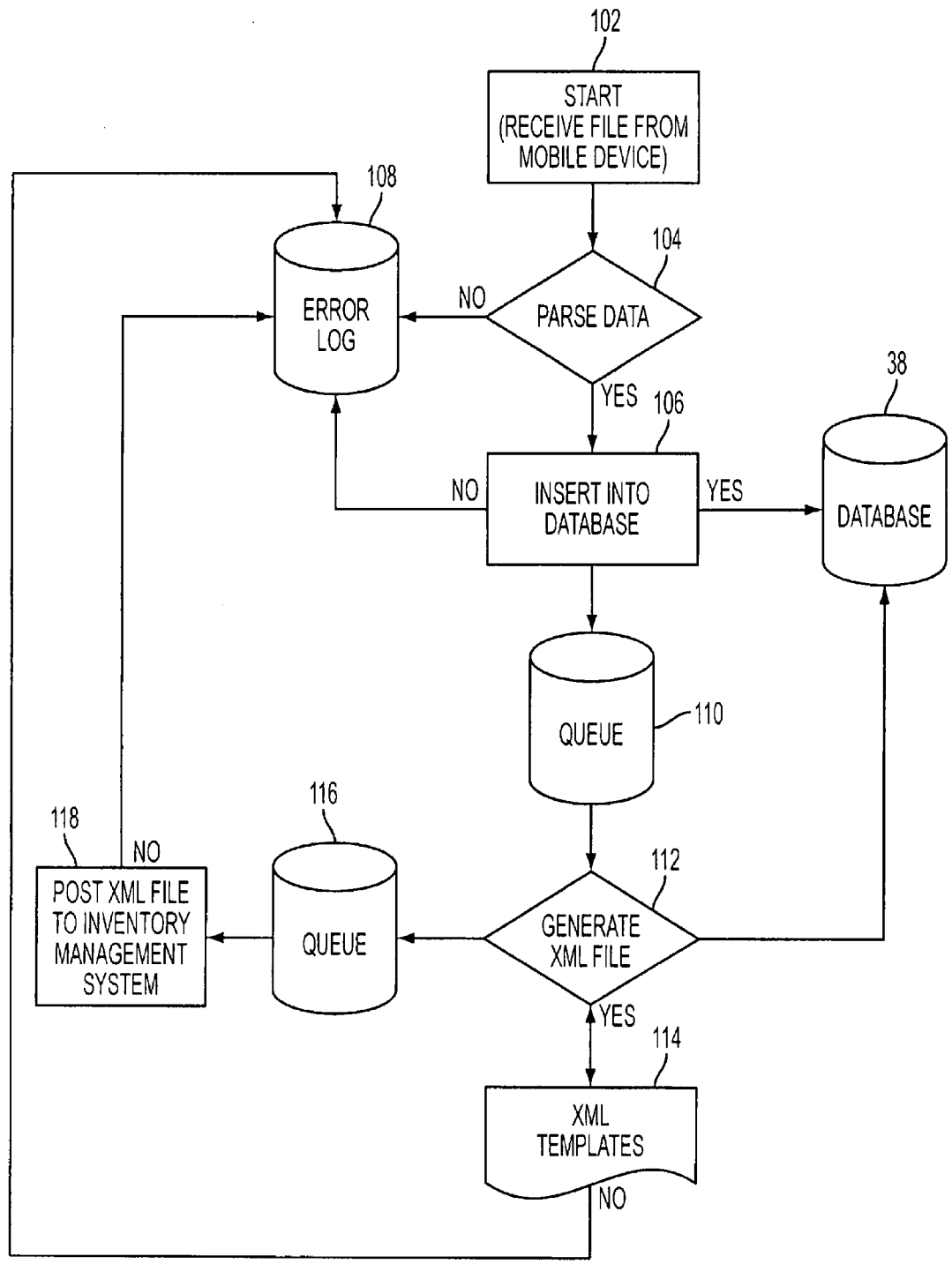
FIG. 2 illustrates uploading data scanned by scanning devices to an inventory management system.

FIG. 2 illustrates uploading data collected by the scanning device 12 to the inventory management system 14. The scanning device 12 may be configured to enable a user to operate in a real time uploading mode or in a delayed uploading mode. In the real time mode, the scanning device 12 may upload the collected data in real time as soon as the data is read from an inventory item. In the delayed mode, the user may delay uploading until a desired amount of the collected data is accumulated in the scanning device 12. When the scanning device 12 is ready for uploading data, the inventory scanner application in the scanning device 12 initiates a data transmission request to the WS adapter 24 to indicate that a particular scanning device 12 has a data file for delivery to the inventory management system 14. In response to the data transmission request, the WS adapter 24 receives the data file from the scanning device 12 (block 102).

When the data file is successfully received, the WS adapter 24 sends a transfer status message to the scanning device 12 acknowledging reception of the uploaded data file. Thereafter, the WS adapter 24 parses the data file (block 104) to read each data record in the file. If the records are in recognizable formats, the WS adapter 24 inserts them into the database 38 (block 106). Otherwise, the WS adapter 24 generates an error signal and produces an error entry in an error log (block 108).

The recognized data records are placed into a queue (block 110) to convert each record into a format appropriate for the inventory management system 14 (block 112). For example, the WS adapter 24 may convert the records into Extensible Markup Language (XML) files using pre-defined XML templates (block 114). The XML files are placed in a queue (block 116) to post them to the inventory management system 14 (block 118). If any of the WS adapter operations is unsuccessful, an appropriate error entry may be recorded in the error log.

The files placed in the inventory management system may have identification information such as a file name. The identification information may identify the user, and the day and time of data collection. In addition to the data file, the scanning device 12 may also send a data field that indicates the data transmission method, i.e. whether the data were uploaded over the radio-access network 16 or the LAN 18.

Figure 3:
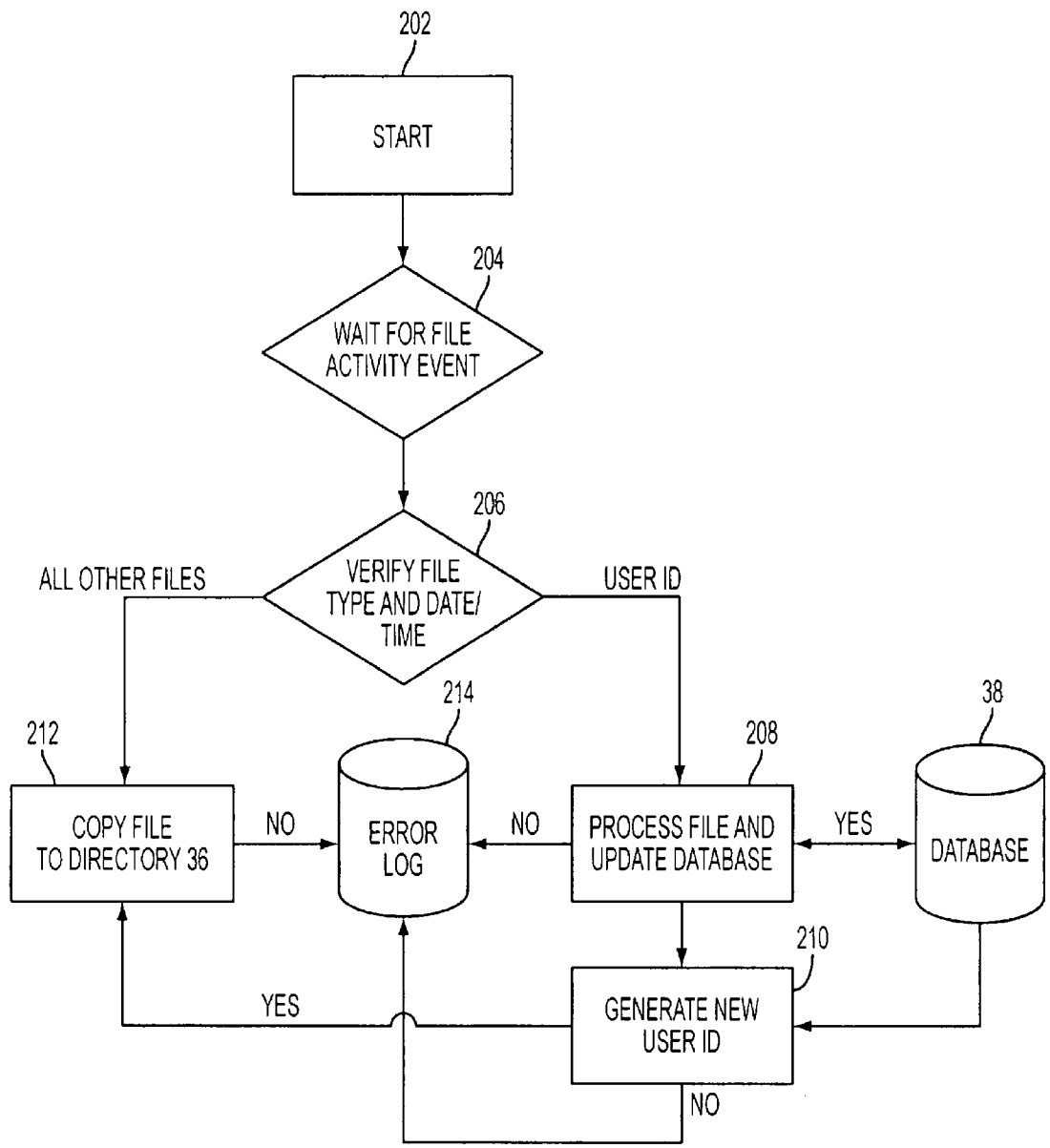
FIG. 3 illustrates downloading control information from the inventory management system to manage operation of the scanning devices.

FIG. 3 illustrates processing control information downloaded from the inventory management system 14 to the scanning devices 12. In particular, the control information may include validation files generated by the inventory management system 14 to validate data scanned by the scanning devices 12. The validation files may define data allowed to be scanned by a selected scanning device 12. The validation files may be generated in accordance with a predetermined schedule, for example, once a day. Also, the control information may include software upgrade files produced to upgrade inventory scanner application software stored in each scanning device 12. In addition, the control information may comprise user identification files that contain user identification information.

The inventory management system 14 may maintain the control information in the IM folder 28 shared by the WS adapter 24 and the inventory management system 14. The WS adapter 24 may periodically check the IM folder 28 for new files and for changes in existing files (block 202). If a new file or a change in an existing file is detected, a file activity event is generated (block 204). In response to this event, the WS adapter 24 determines the type of a new or modified file and the data and time of file generation or modification (block 206).

If the WS adapter 24 detects a user identification file transferred from the inventory management system 14, the WS adapter 24 looks up the user access information table in the database 38 for the user access information associated with the user identified by the user identification file (block 208). The user access information defines which information may be accessed by a particular user. The information in the database 38 may be modified in accordance with the received user identification file. Further, the WS adapter 24 adds the user access information to the received user identification file to generate a new user identification file (block 210). The new user identification file is transferred to the outbound directory 36 of the data synchronization system 30 for delivery to the scanning device 12. The user access information added by the WS adapter determines access priviledges of the user identified in the user identification file and indicates to the inventory scanner application in the scanning device 12 which information should be presented to that particular user. For example, the user identification file may indicate which menu should be displayed by the scanning device 12 operated by the user identified in the user identification file.

When the WS adapter 24 detects a new or modified file other than the user identification file, it copies this file to the outbound directory 36 of the data synchronization system 30 for delivery to the scanning device 12 (block 212). Any error that occurs during the control information transferring procedure may be registered in the error log (block 214).

Based on the control information in the directory 36, the data synchronization system 30 generates a data synchronization package including the files that have to be downloaded to the scanning devices 12. The data synchronization system 30 may compare the data synchronization package with the files previously delivered to the respective scanning devices 12 to create delta files containing differences between new files and the previously delivered files. The delta files may be downloaded to a scanning device 12 over the radio-access network 16 as soon as the scanning device 12 connects to the radio-access network 16. Alternatively, the delta files may be downloaded to a scanning device 12 over the LAN 18, when the scanning device 12 is connected to the LAN 18.

The control information downloaded to a scanning device 12 defines data that are allowed to be scanned by that scanning device 12. Also, it determines which information the scanning device 12 is allowed to present to a particular user. For example, the scanning device 12 may generate a menu presenting various options for the user. The downloaded control information may instruct the scanning device 12 which menu should be presented for a particular user. Moreover, the control information provides upgrades to the software stored in the scanning device 12 to run inventory operation. In addition to simply scanning information from inventory items, the scanning device 12 is enabled to perform more complex inventory management functions.

Figure 4:
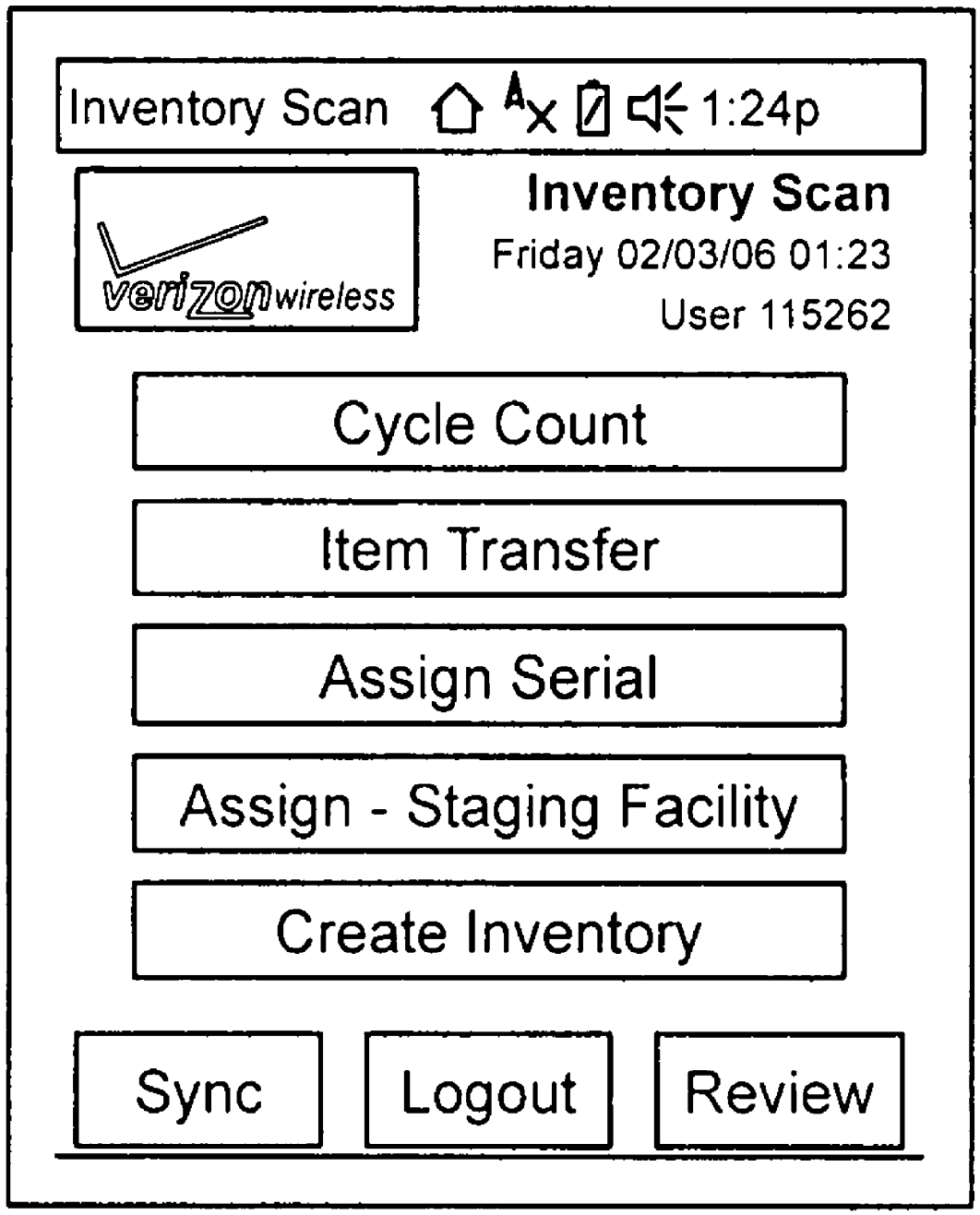
FIG. 4 shows an exemplary menu displayed by a scanning device.

FIG. 4 shows an exemplary menu displayed by the scanning device 12 to present various options to the user. The content of the menu presented for a particular user may be determined by the user access information stored in the database 38 for that particular user. For example, the user may be enabled to perform a cycle count procedure where a small subset of inventory is counted on any given day. Cycle counts contrast with traditional physical inventory in that physical inventory stops operation at a facility and all items are counted, audited, and recounted at one time. Cycle counts are less disruptive to daily operations, provide an ongoing measure of inventory accuracy and procedure execution, and can be tailored to focus on items with higher value or higher movement. Further, the user is enabled to perform an item transfer procedure to view and select items for transfer. Also, the user is able to carry out an assign serial number procedure to assign serial numbers to products or other inventory items. The other options in the exemplary menu allows the user to assign a staging facility and to create inventory.

The Sync button on the menu may be used to synchronize the data stored in the scanning device with the data of the inventory management system 14. The Review button may enable the user to review a data file before uploading it to the inventory management system 14. When this button is pressed, the scanning device 12 may display a page enabling the user to select a data file for review. Thereafter, the user may review the selected file and edit any record. The Logout button enables the user to logout so as to prevent unauthorized access to the scanning device 12.

While the foregoing has described what are considered to be the best mode and/or other preferred examples, it is understood that various modifications may be made therein and that the invention or inventions disclosed herein may be implemented in various forms and examples, and that they may be applied in numerous applications, only some of which have been described herein.

It is intended by the following claims to claim any and all applications, modifications and variations that fall within the true scope of the present teachings.

What is claimed is:

1. A system for inventory scanning comprising:
   a plurality of scanning devices configured for scanning information representing inventory items to produce input data and configured for two-way data communication via a radio-access network, and
   a web services scanner adapter coupled to the radio-access network and to an inventory management system, configured for receiving the input data from the scanning devices through the radio-access network and transferring the input data from the scanning devices to the inventory management system, and configured for receiving control information from the inventory management system and delivering the control information to the scanning devices through the radio-access network, wherein:
   each scanning device of the plurality of scanning devices includes a data processing unit for running an inventory scanning application managed by the inventory management system based on the downloaded control information; and
   the web services scanner adapter is configured to provide a scanning device with user identification data to define information to be presented by the scanning device to a particular user identified by the user identification data.

2. The system of claim 1, wherein the web services scanner adapter is configured to produce the user identification data in response to user identification information supplied from the inventory management system.

3. The system of claim 1, wherein the web services scanner adapter is configured to provide a scanning device with validation data that defines information allowed to be read by the scanning device.

4. The system of claim 3, wherein the validation data is supplied to the web services scanner adapter from the inventory management system.

5. The system of claim 1, wherein the scanning devices are configured to communicate with the scanner adapter over a Code Division Multiple Access (CDMA) wireless radio-access network.

6. The system of claim 1, wherein the web services scanner adapter is coupled to the inventory management system over an Internet Protocol (IP) network.

7. The system of claim 1, further comprising a data synchronization system connectable to the web services scanner adapter for synchronizing data in the scanning devices with the control information supplied from the inventory management system.

8. The system of claim 1, further comprising a scanner manager coupled to the web services scanner adapter for controlling user access to the scanning devices.

9. The system of claim 8, wherein the scanner manager is configured for preventing unauthorized access to the scanning devices.

10. The system of claim 8, wherein the scanner manager is configured for setting a scanning device into a predetermined mode of operation.

11. The system of claim 8, wherein the scanner manager is configured for enabling a scanning device to scan predetermined information.

12. The system of claim 11, wherein the scanner manager is configured for enabling the scanning device to scan a predetermined barcode.

13. The system of claim 8, wherein the scanner manager is configured for enabling a user of a scanning device to monitor data transferred from the scanning device to the inventory management system before the transferred data are loaded into the inventory management system.

* * * * *